United States Patent [19]

Kirigaya

[11] Patent Number: 5,227,828
[45] Date of Patent: Jul. 13, 1993

[54] AUTOMATIC FOCUSING DEVICE FOR CAMERA LENS

[75] Inventor: Tadayuki Kirigaya, Tokyo, Japan

[73] Assignee: Asahi Kogaku Kogyo Kabushiki Kaisha, Tokyo, Japan

[21] Appl. No.: 639,371

[22] Filed: Jan. 10, 1991

Related U.S. Application Data

[63] Continuation of Ser. No. 421,856, Oct. 16, 1989, abandoned.

[30] Foreign Application Priority Data

Oct. 18, 1988 [JP] Japan .................. 63-135835
Oct. 28, 1988 [JP] Japan .................. 63-272816

[51] Int. Cl.$^5$ ............................ G03B 13/36
[52] U.S. Cl. ................................ 354/400
[58] Field of Search ......... 354/400, 402, 401, 403, 354/408; 352/140; 358/227

[56] References Cited

U.S. PATENT DOCUMENTS

| | | | |
|---|---|---|---|
| 4,238,154 | 12/1980 | Biber et al. | 354/401 |
| 4,293,206 | 10/1981 | Tokutomi et al. | 354/400 |
| 4,389,106 | 6/1983 | Maruyama | 354/403 |
| 4,459,006 | 7/1984 | Sakai et al. | 354/400 X |
| 4,482,234 | 11/1984 | Takagi et al. | 354/402 |
| 4,508,443 | 4/1985 | Matsuzaki et al. | 354/402 |
| 4,531,157 | 7/1985 | Ishikawa | 354/400 X |
| 4,531,158 | 7/1985 | Murakami et al. | 358/227 |
| 4,557,577 | 12/1985 | Shinoda | 354/400 |
| 4,588,278 | 5/1986 | Horigome | 354/406 |
| 4,611,244 | 9/1986 | Hanma et al. | 358/227 |
| 4,639,588 | 1/1987 | Shinoda | 354/403 X |
| 4,641,942 | 2/1987 | Sakai et al. | 354/406 |
| 4,647,979 | 3/1987 | Urata | 358/227 |
| 4,671,640 | 6/1987 | Akada et al. | 354/402 |
| 4,695,893 | 9/1987 | Makino et al. | 358/227 |
| 4,730,201 | 3/1988 | Sasagaki | 354/402 |
| 4,750,013 | 6/1988 | Yasukawa | 354/400 |
| 4,764,787 | 8/1988 | Hamada et al. | 354/408 |
| 4,768,054 | 8/1988 | Norita et al. | 354/408 |
| 4,783,677 | 11/1988 | Hamada et al. | 354/402 |
| 4,786,934 | 11/1988 | Kunze et al. | 354/400 |
| 4,812,636 | 3/1989 | Kusaka et al. | 354/408 X |
| 4,855,776 | 8/1989 | Akashi | 354/402 |
| 4,994,843 | 2/1991 | Kitazawa | 354/409 |

FOREIGN PATENT DOCUMENTS

0347042 12/1989 European Pat. Off.
3336265 4/1984 Fed. Rep. of Germany.

*Primary Examiner*—W. B. Perkey
*Attorney, Agent, or Firm*—Sandler, Greenblum & Bernstein

[57] ABSTRACT

An automatic focusing device by which a focusing lens is operated in accordance with an object distance measured by a distance measuring unit. The distance of an object in a distance measuring zone provided in a view finder is determined to detect an abrupt change thereof. If the object distance is abruptly changed, the focusing lens is not operated to focus on a new object appearing in the measuring zone. Conversely, if the object distance is not abruptly changed, the focusing lens is operated to again focus on the object in the measuring zone.

16 Claims, 8 Drawing Sheets

F I G. 1
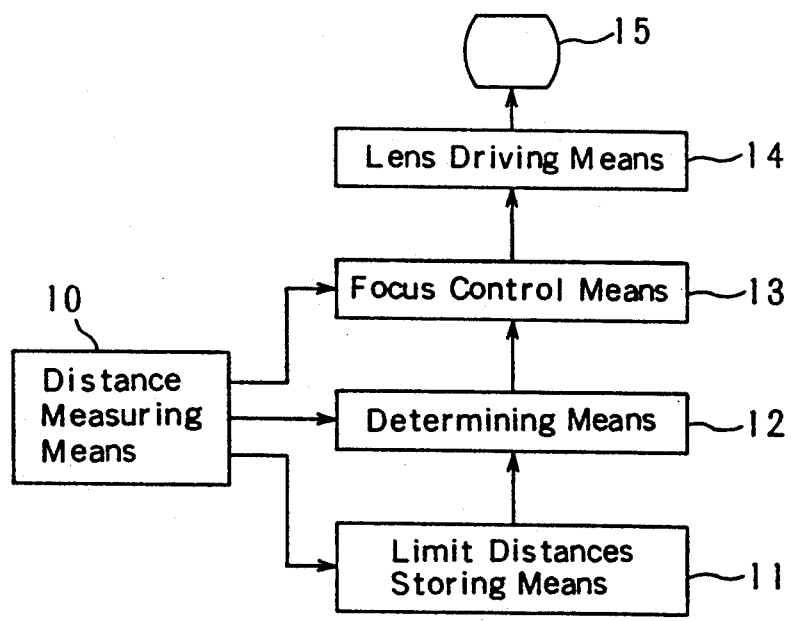
F I G. 2
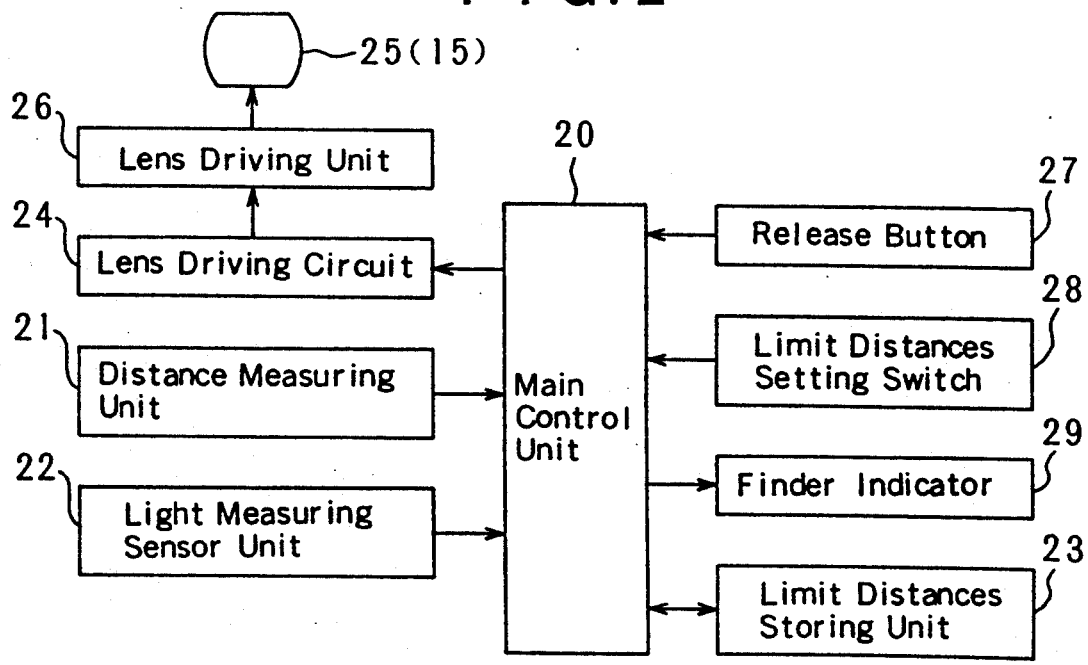

AUTOMATIC FOCUSING DEVICE FOR CAMERA LENS

This application is a continuation of application Ser. No. 07/421,856, filed Oct. 16, 1989, now abandoned.

BACKGROUND OF THE INVENTION

1. Field of the Invention

The present invention relates to an automatic focusing device, more particularly, to an automatic focusing device in which a focusing distance range can be set by a photographer.

2. Description of the Related Art

In a conventional automatic focusing device provided in an automatic focusing single-lens reflex camera, a distance measuring zone is formed in a field of vision of a vie finder of the camera, so that the photographer can determine on which part of an object the camera lens is focused. The object light coming into the distance measuring zone is divided into two parts, which are fed to a measuring sensor having CCD, and a focusing calculation is carried out by a focusing control unit to obtain a defocus amount and direction. An AF motor is driven according to this vector value, and the photographing lens is moved to a position at which the object is in focus.

The driving of the above automatic focusing device is started by a half depression of a release button. In a servo AF, when the release button is partly depressed, a distance measuring operation and a focusing operation for the photographing lens are carried out at predetermined intervals.

When a photograph is to be taken by the above conventional automatic focusing camera, if the object to be photographed moves out of the distance measuring zone, the camera is controlled to focus on a new object coming into the distance measuring zone. Especially, when a moving object is to be photographed, often the object to be photographed can not be followed correctly and moves temporarily out of the distance measuring zone. In such a case, if another object coming into the distance measuring distance zone is positioned at infinity or within a short distance, the photographing lens is moved to infinity or to the short distance focusing position. Therefore, even if the former moving object again moves into the distance measuring zone, a long time is required to move the photographing lens to a position at which the moving object is in focus. When photographing a moving object, usually the camera must be operated very quickly, and if a long time is required to focus the lens on the object to be photographed, then chance to take a desired photograph is often lost.

In particular, when a moving object is to be photographed by using an ultra-telephotographic lens, in which the focusing time is normally long, the above problem readily occurs.

SUMMARY OF THE INVENTION

Therefore, the object of the present invention is to provide an automatic focusing device in which, even if a moving object moves out of and again comes into the distance measuring zone, the lens is focused on the moving object in a short time by a simple operation.

According to the present invention, there is provided an automatic focusing device including a means for measuring an object distance, a means for driving a focusing lens of a photographing lens provided in a camera, a means for controlling the lens driving means, and a means for determining whether or not an object distance has abruptly changed.

The control means controls the lens driving means, based on the object distance measured by the measuring means, so that the focusing lens is driven to focus on an object. Namely, the control means controls the lens driving means so that the focusing lens is driven to focus on an object when the determining means determines that the object distance measured by the measuring means has not abruptly changed, and restricts an operation of the driving means when the determining means determines that the object distance has abruptly changed.

Further, according to the present invention, there is provided an automatic focusing device including a means for measuring an object distance, a means for driving a focusing lens of a photographing lens provided in a camera, a means for controlling the driving means, a means for storing a long limit distance and a short limit distance defining an object distance range over which the focusing lens is operated for focusing, and a means for determining whether or not the object distance measured by the measuring means is whithin the long and short limit distances stored by the limit distances storing means.

The control means controls the driving means, based on the object distance measured by the measuring means, so that the focusing lens is driven to focus on an object. Namely, the control means controls the lens driving means so that the focusing lens is driven to focus on an object when the determining means determines that the object distance measured by the measuring means is within the long and short limit distances, and restricts an operation of the driving means when the determining means determines that the object distance is not within the long and short limit distances.

Still further, according to the present invention, there is provided an automatic focusing device including a means for measuring an object distance, a means for driving a focusing lens of a photographing lens provided in a camera to a focusing position, a means for storing the object distance when in focus, a means for storing an allowable difference between a present object distance measured by the measuring means and an object distance when in focus stored by the object distance storing means, and a means for controlling a focusing operation based on an object distance measured by the measuring means, to bring an object into focus.

When the object is in focus, the control means controls the object distance storing means to store the object distance when in focus, and determines whether or not a difference between a present object distance measured by the measuring means and an object distance stored by the object distance storing means is within the allowable difference stored by the allowable difference storing means. If the difference is smaller than the allowable difference, the driving means is operated to focus the lens on the object distance measured by the measuring means, and if the difference is larger than the allowable difference, the driving means is operated to focus the lens on the object distance stored by the object distance storing means, or is not operated and the present focal position is maintained.

BRIEF DESCRIPTION OF THE DRAWINGS

The present invention will be better understood from the description of the preferred embodiments of the invention set forth below, together with the accompanying drawings, in which:

FIG. 1 is a block diagram of a construction of the present invention;

FIG. 2 is a block diagram of a construction of an embodiment of the present invention;

DESCRIPTION OF THE PREFERRED EMBODIMENTS

Figure 3:
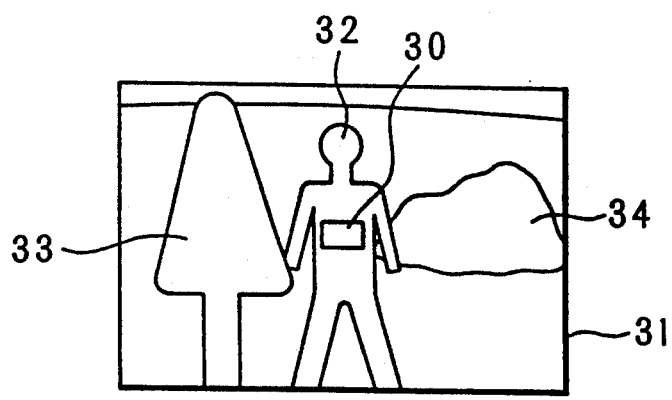
FIG. 3 is a schematic view showing a relationship between the field of vision of a view finder and a distance measuring zone.

The present invention will not be described with reference to embodiments shown in the drawings.

In FIG. 1, a limit distances storing means 11, a determining means 12, and a focus control means 13 are connected to a distance measuring means 10 measuring a distance from a camera to an object. The limit distances storing means 11 stores a long limit distance and a short limit distances, and the determining means 12 determines whether or not a present object distance output from the distance measuring means 10 is within a range of the limit distances stored in the limit distances storing means 11. The limit distances storing means 11 is connected to the determining means 12, which, in turn, is connected to the focus control means 13.

The focus control means 13 is connected to a lens driving means 14 driving a focusing lens 15 of a photographing lens so that the focusing lens 15 is focused on an object.

An object distance signal measured by the distance measuring means 10 is output to the limit distances storing means 11 when storing a limit distance, and output to the determining means and the focus control means 13 when taking a photograph.

The limit distances storing means 11 stores two limit distances, i.e., a long distance limit and a short distance limit, and outputs the long and the short distance limits to the determining means 12 when taking a photograph. The long and the short distance limits are limits of the object distance at which the focusing lens can be focused on the object.

The determining means 12 compares the long and short limit distances output from the limit distances storing means 11 with a measured distance output from the distance measuring means 10, and determines whether or not the measured distance is within the range defined by the long and short limit distances, and outputs a signal to the focus control means 13 denoting whether or not the measured distance is within the defined range.

The focus control means 13 receives a measured distance signal output from the measuring means 10 and the determining signal output from the determining means 12. If the determining signal denotes "within", the focus control means 13 starts the operation of the lens driving means 14 (if the lens driving means 14 is in operation, the focus control means 13 continues the operation of the lens driving means 14), so that the focusing lens is moved to a position at which the focusing lens is focused on the object. Conversely, if the determining signal denotes "not within", the focus control means 13 does not control the lens driving means 14, or controls the lens driving means 14 so that the focusing lens is moved to the long or short limit distance position.

FIG. 2 shows a schematic diagram of a camera having a construction for limiting a focusing range.

A main control unit 20 calculates a distance measured by the distance measuring means 10, functions as the determining means 12 and the focus control means 13, and carries out a system control and a calculations for the whole camera. Sensors are connected to the main control unit 20, and include a distance measuring unit 21 including a CCD as a sensor portion of the distance measuring means 10, and a light measuring sensor 22 for measuring an object brightness.

A limit distance storing unit 23 and a lens driving circuit 24 are also connected to the main control unit 20. The limit distance storing unit 23 operates as the limit distance storing means 11, and the lens driving circuit 24 is connected to the focusing lens 15 of the photographing lens 25 through a lens driving unit 26, and operates as the lens driving means 14 for driving the focusing lens 15.

As is well known, an object image in a distance measuring zone 30 (see FIG. 3) provided in a view finder 31 is focused by the photographing lens 25 and divided into two parts to be lead onto a light acceptance surface of the CCD of the distance measuring unit 21. The CCD outputs image signals corresponding to the divided object images, and the image signals are input to the main control unit 20.

In the main control unit 20, a defocus amount and direction is obtained by a well-known correlation method, and an object distance is obtained in accordance with a lens position. This object distance is stored in the limit distance storing unit 23 when setting limit distances. Conversely, in a usual photographing operation, the lens driving circuit 24 is driven in accordance with the object distance so that the focusing lens 15 is moved to a position at which the object is in focus. When a photographing operation is carried out with limited focusing distances, the object distance is compared with the long and short limit distances stored in the limit distance storing unit 23, and it is determined whether or not the object distance is within a range defined by the long and short limit distances. If it is determined that the object distance is within that range, a focusing operation is carried out as in a usual photographing operation, and if it is determined that the object distance is not within that range, the focusing operation is not carried out.

Further, switches such as a release button 27 and a limit distances setting switch 28 are connected to the main control unit 20.

The release button 27 is a well-known two-step type switch, whereby, when the release button 27 is partly depressed, a distance measuring switch is turned ON, and when the release button 27 is fully depressed, the distance measuring switch is kept ON and a release switch is turned ON.

The limit distance setting switch 28 is provided for setting focus limit distances. When the limit distance setting switch 28 is turned ON, the main control unit 20 starts to set the limit distances. That is, a first limit distance (which is an object distance) is stored to the limit distance storing unit 23 when the release button 27 is partly depressed. Then the release button 27 is released and again partly depressed and a second limit distance is stored to the limit distance storing unit 23.

A finder indicator 29 is provided in a field of vision of the view finder 31 and connected to the main control unit 20. The finder indicator 29 indicates information about an exposure, such as shutter speed, focusing information, i.e., whether or not a focusing operation is finished, and information on whether or not a measured distance is within the range of the long and short limit distances.

The main control unit 20 is a microcomputer, which carries out the above functions in accordance with programs stored in a ROM, and an AE calculation based on an object brightness signal output from the measuring sensor 22, and further, carries out calculation and control functions for the whole camera, such as setting a shutter speed and an aperture value, and controlling a shutter and an aperture.

An operation of the embodiment described above is described below with reference to FIG. 3, which shows a case in which a person 32 to be photographed is between a tree 33 near to the camera and a rock 34 far from the camera.

First, the photographer turns ON the limit distances setting switch 28, to set a limit distances setting mode, and then points the camera at the tree 33 so that the tree 33 is in the distance measuring zone 30, and partly depressed the release button 27. As a result, the main control unit 20, the distance measuring unit 21, and the lens driving circuit 24 are operated to start the distance measuring and focusing operations, so that the photographing lens 25 is focused on the tree 33 when the distance $L_1$ from the camera to the tree 33 in focus is stored in the limit distance storing unit 23 as a first limit distance.

When this focusing operation is completed, the photographer releases the release button 27, and points the camera at the rock 34, so that the distance measuring zone 30 is adjusted to measure the distance to the rock 34. And then partly depresses the release button 27. As a result, as described above, the main control unit 20, the measuring distance unit 21, and the lens driving circuit 24 are operated to start the distance measuring and focusing operations, so that the photographing lens 25 is focused on the rock 34. The distance $L_2$ from the camera to the rock 34 when in focus is stored in the limit distances storing unit 23 as a second limit distance.

The operation for setting limit distances is thus completed, as described above, and subsequently, the camera will operate to focus only on an object located between the tree 33 and the rock 34; namely, the camera will not operate to focus on an object nearer than the tree 33 and farther than the rock 34. Therefore, when the photographer is taking a picture while following the movements of the person 32, even if the person 32 moves out of the distance measuring zone 30, a focusing operation is not carried out for an object nearer than the tree 33 and an object positioned farther than the rock 34. Accordingly, when the person 32 again moves into the distance measuring zone 30, the camera operates to focus on the person 32 in the distance measuring zone 30, in a very short time.

An operation of the main control unit 20 is described below with reference to FIGS. 4 through 6.

Figure 4:
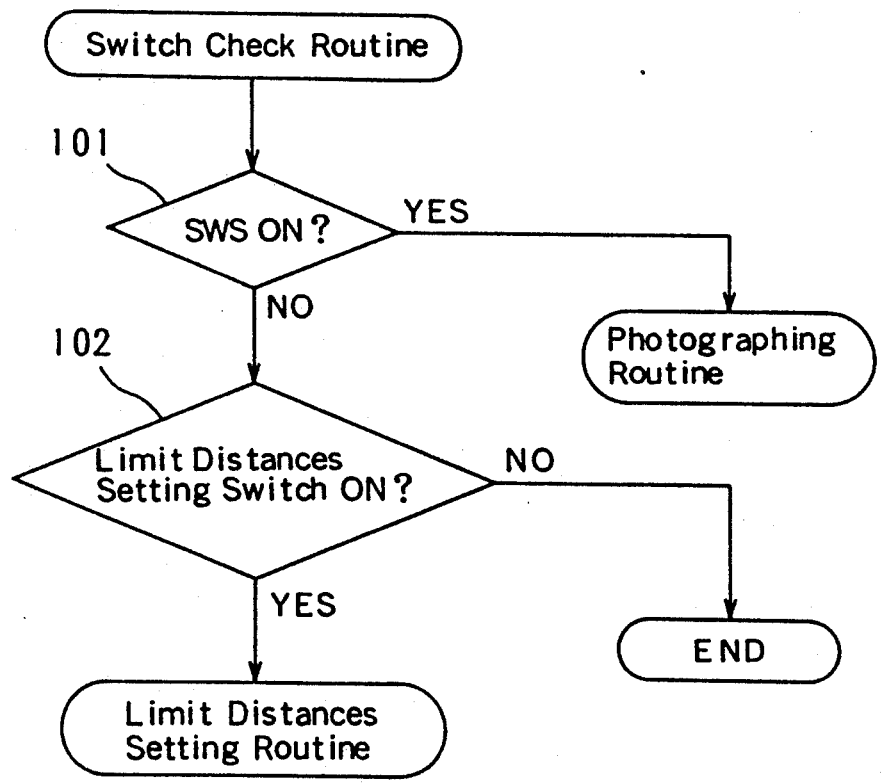
FIG. 4 is a flow chart of a process for checking the state of the switches of the camera.

In FIG. 4, after a power supply is turned ON, the main control unit 20 repeatedly carried out, at very short intervals, a check of an ON-OFF condition of the release button 27 (i.e. the measuring switch SWS) and the limit distance setting switch 28, and waits until the distance measuring switch SWS or the limit distance setting switch 28 is turned ON. When the distance measuring switch SWS is turned ON in STEP 101, the process goes to a photographing routine, a mode of which has been set in a mode setting routine. If the distance measuring switch SWS is turned OFF and the limit distances setting switch 28 is turned ON, the process goes from STEP 102 to a limit distances setting routine. In STEP 102, if the limit distances setting switch 28 is turned OFF, the process goes to an END routine.

Therefore, if the photographer turns the power supply ON and turns the limit distances setting switch 28 ON, the main control unit 20 starts a program for setting the limit distances.

Figure 5:
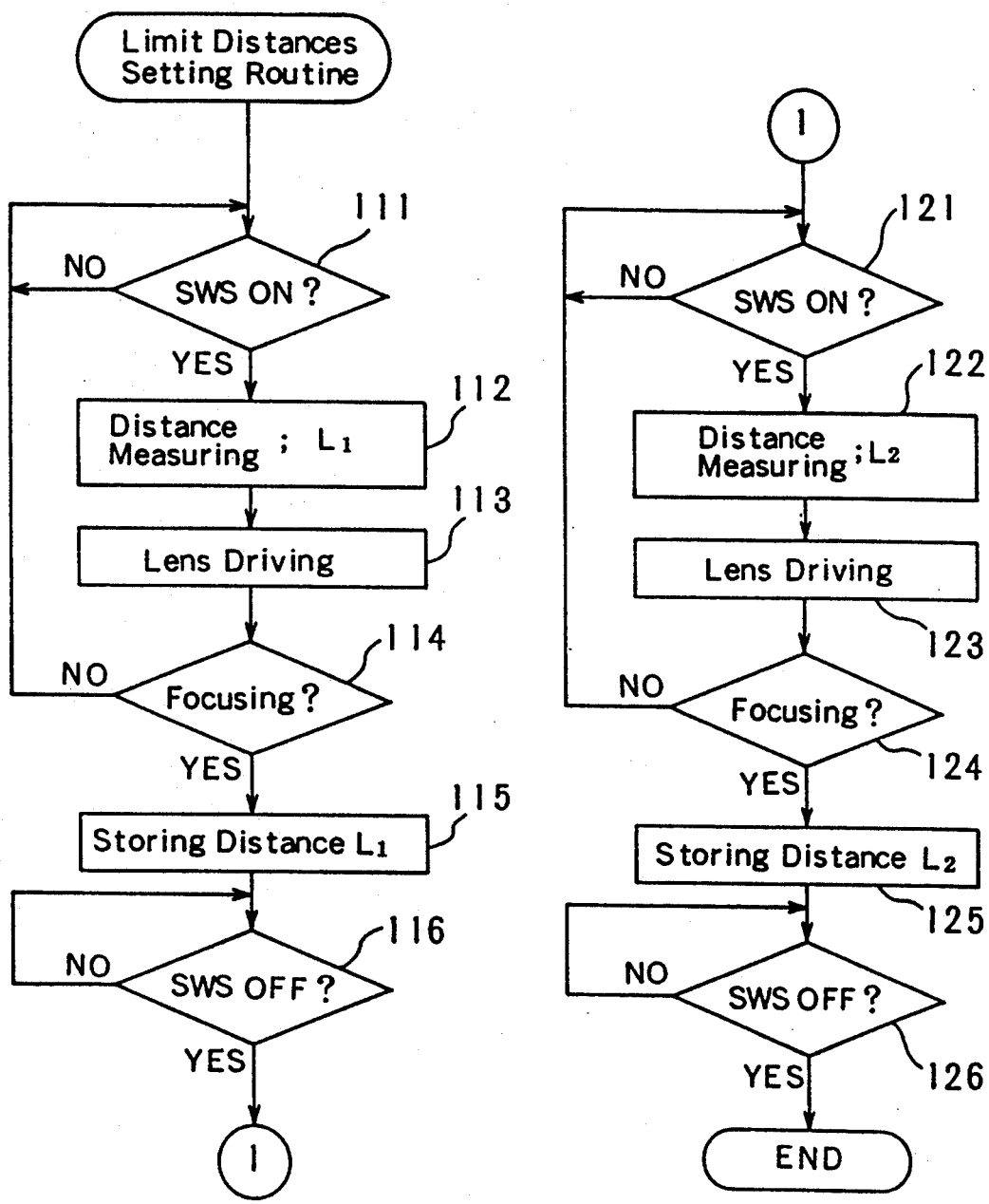
FIG. 5 is a flow chart of a process for setting the limit distances.
Figure 6:
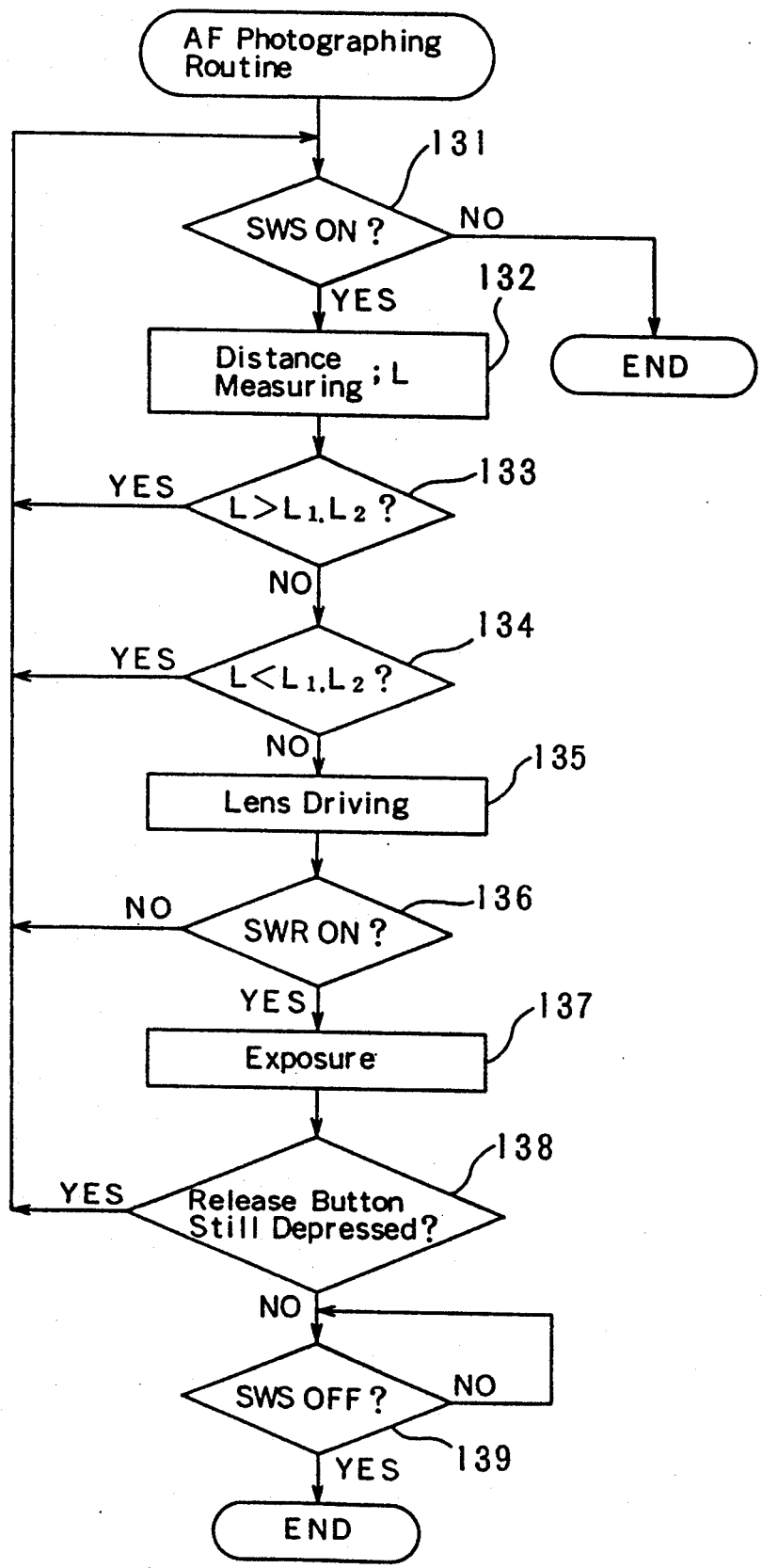
FIG. 6 is a flow chart of a process for taking a photograph using an automatic focusing operation.

In the limit distances setting mode shown in FIG. 5, in STEP 111 the main control unit 20 determines whether or not the release button 27 is partly depressed, i.e., the distance measuring switch SWS is turned ON. If the distance measuring switch SWS is not turned ON, this process of STEP 111 is repeated until the distance measuring switch SWS is turned ON. Note that, even if the photographer incorrectly fully depresses the release button 27, i.e., even if the release switch SWR is turned ON, the process does not go to an exposure routine.

The photographer points the camera at an object at a far distance or at a close range, and then adjusts the distance measuring zone 30 to the object by partly depressing the release button 27. As a result, since the distance measuring switch SWS is turned ON, in STEP 112 the main control unit 20 starts to drive the CCD of the distance measuring unit 21 to measure the object distance $L_1$, and in STEP 113, operates the lens driving circuit 24 based on the distance $L_1$ so that the focusing lens 15 is moved to the focusing position. In STEP 114, if the focusing lens 15 is not focused on the object, the process returns to STEP 111, and STEPS 111 through 114 are repeated until he object is in focus, in a condition that the distance measuring switch SWS is turned ON.

When the object is in focus, in STEP 115, the main control unit 20 stores the distance $L_1$ as a first limit distance, to the limit distances storing unit 23, and waits until the distance measuring switch SWS is turned OFF in STEP 116.

When the operation of the lens driving circuit 24 is stopped, or a focusing indicating light appears in the view finder indicator 29, the photographer recognizes that a first distance measuring operation is finished, and then releases the release button 27, and points the camera at an object at a close range or at a far distance, and when the object appears in the distance measuring zone 30, partly depresses the release button 27.

The main control unit 20 senses that the distance measuring switch SWS is turned OFF (STEP 116) and then turned ON (STEP 121), and in STEP 122, starts the CCD of the distance measuring unit 21 to measure an object distance $L_2$. The main control unit 20 operates the lens driving circuit 24 based on the distance $L_2$ to move the focusing lens 15 to a focusing position, and then the distance measuring operation and the lens driving operation are repeated in STEPS 121 through 124 until the object is in focus, in a condition that the distance measuring switch SWS is turned ON.

In the focusing operation, in STEP 125 the main control unit 20 stores the distance $L_2$ as a second limit distance to the limit distance storing unit 23, and if the distance measuring switch SWS is turned OFF in STEP 126, the process for this limit distances setting routine is ended and the process returns to the switch check routine (FIG. 4) carried out at predetermined intervals.

The photographer recognizes that the limit distances setting operation is completed, when the operation of the lens driving circuit 24 is stopped or a focusing indication light appears in the view finder indicator 29, and then releases the release button 27, whereby the limit distances setting operation is completed.

A photographing operation using the limit distances explained above is described below with reference to FIG. 6.

The photographer points the camera at an object to form a desired composition of a picture, adjusts the distance measuring zone 30 to cover the desired object, and then partly depresses the release button 27.

When the release button 27 is partly depressed, the distance measuring switch SWS is turned ON and the process goes from STEP 131 to STEP 132, so that the main control unit 20 starts the CCD of the distance measuring unit 21 to start a distance measuring operation. A measured distance L obtained by this distance measuring operation in STEP 132 is compared with the first and second limit distances $L_1$ and $L_2$ stored to the limit distances storing unit 23, and in STEPS 133 and 134, it is determined whether or not the measured distance L is within in a range defined by the first and second limit distances $L_1$ and $L_2$.

If the distance L is within the defined range, in STEP 135, the lens driving circuit 24 is operated so that the focusing lens 15 is moved to a focusing position corresponding to the measured distance L. In STEP 136, if the release switch SWR is turned OFF, the process returns to STEP 131. Namely, these distance measuring and lens driving operations are repeated until the focusing lens 15 is focused on the object, under the condition that the release switch SWR is turned OFF and the distance measuring switch SWS is turned ON.

Although the photographer moves the camera in accordance with a movement of the object, while partly depressing the release button 27, if the object moves quickly, or if an obstacle appears between the object and the photographer, the object may move out of the distance measuring zone 30, and therefore, the distance measuring zone 30 may cover an object at infinity or an object at very close range. In this case, if the measured distance L is not within a range of the first and second limit distances $L_1$ and $L_2$, the main control unit 20 does not carry out a lens driving process, but repeats only the distance measuring operation of STEPS 131 through 134.

When the photographer has the desired object in the distance measuring zone 30, since the main control unit 20 carries out the lens driving process, the focusing lens 15 is focused on the object, and thus if the measured distance L of the object in the distance measuring zone 30 is not within the range of the limit distances $L_1$ and $L_2$, the focusing lens 15 is not driven, and therefore, a range in which the focusing lens 15 is moved is narrow. Accordingly, even if the object repeatedly moves in and out of the distance measuring zone 30, a period necessary for focusing the lens on the object is short.

When the photographer fully depresses the release button 27, the release switch SWR is turned ON and the process goes from STEP 136 to STEP 137, and thus the main control unit 20 operates a shutter and an aperture and so on, whereby an exposure to a film is carried out.

After this exposure, if the release button 27 is still fully depressed, the process returns from STEP 138 to STEP 131 and the distance measuring and focusing operations are repeated. Conversely, if the release button 27 is not fully depressed or is released, the process goes to STEP 139 to determine whether or not the distance measuring switch SWS is turned OFF. STEP 139 is carried out repeatedly until the distance measuring switch SWS is turned OFF, and when the distance measuring switch SWS is turned OFF, the process goes to the END routine. Note that, when the release button 27 is kept fully depressed, a release mode is operated in which the exposure process is repeated until the release switch SWR is turned OFF.

As is obvious from the above description, according to the embodiment, when an object moving within a range of a constant distance is photographed, if the limit distances are set, the focusing lens 15 does not move over the range of the limit distances. Therefore, the amount of movement of the focusing lens 15 for focusing is negligible, and thus the focusing time is short.

Further, since the limit distances can be set by software, countermeasures against the a shock caused by contact with a stopper member and against an overload of a drive source of the focusing lens 15 is not necessary, different from a mechanical limiter which restricts a rotation of a distance ring by the stopper member. Still further, since a mechanical structure is not needed for the limit distances, a conventional interchangeable lens for an automatic focusing camera can be used as it is.

Although the lens driving operation is not carried out when the measured distance L is not within the range of the limit distances set by the limit distances setting routine in the above embodiment, the present invention may be constructed in such a manner that the lens driving operation is carried out within the range of the limit distances, even if the measured distance L is not within that range.

In the above embodiment, although the distance measuring operation and the focusing operation are used for setting the limit distances, the limit distances may be set by another means. For example, the present invention may be constructed in such a manner that the focusing mode is changed to a manual mode, a distance ring of the photographing lens is manually rotated, and a setting button is depressed at a position at which the photographer would like to set the limit distances, to store that distance to the limit distances storing unit 23. In this case, the stored distance is obtained by a distance signal output from the photographing lens by a movement of the distance ring.

The present invention may be constructed in such a manner that a data back is provided to a camera, whereby desired limit distances are input by a key operation, and the distances input by the key operation are stored to the limit distances storing unit 23.

Further, the present invention may be constructed in such a manner that, in the limit distance setting routine, only one limit distance is input to the limit distances storing unit 23, and the other limit distance is selected as infinity, or the shortest photographable distance of the photographing lens.

Figure 7:
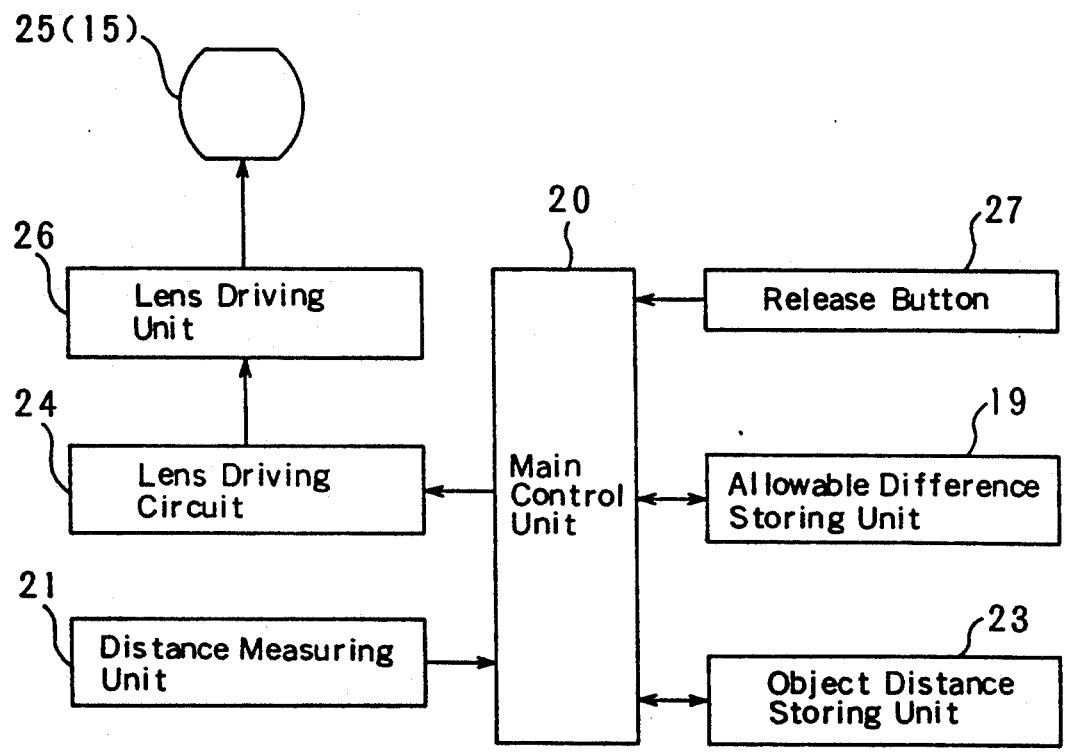
FIG. 7 is a block diagram of a construction of another embodiment of the present invention.

FIG. 7 shows a block diagram of another automatic focusing device according to the present invention. Note in this drawing, the same or corresponding parts are shown by the same reference numerals as in FIG. 2.

A main control unit 20 generally controls the operation of the automatic focusing device of the present invention. Namely, a distance measuring unit 21 connected to the main control unit 20 measures an object distance to output a signal corresponding to the measured distance. The distance measuring unit 21 has a CCD to which a part of an object aerial image formed by a photographing lens is fed. This part is usually an object around the optical axis, and is divided into two parts to be fed on the CCD. The CCD, i.e., the distance measuring distance sensor, outputs image signals for each divided signal to the main control unit 20.

The lens driving means is constructed by a lens driving circuit 24 and a lens driving unit 26. The lens driving unit 26 drives a focusing lens 15 of a photographing lens 25 and is connected to the main control unit 20 through a lens driving circuit 24. The lens driving unit 26 uses an AF motor as a driving source.

The above construction forms a feed back system for focusing. Usually, the main control unit 20 obtains a defocus amount and direction based on a pair of image signals output from the distance measuring unit 21, and based on the defocus amount and direction, operates the lens driving circuit 24 and the lens driving unit 26 to drive the focusing lens 15 to be focused on the desired object.

A release button 27, an object distance storing unit 23, and an allowable difference storing unit 19 are connected to the main control unit 20. The release button 27 operates as shown in FIG. 2, i.e., operates the main control unit 20 to carry out the focusing operation when the release button 27 is partly depressed, and to release a shutter when the release button 27 is fully depressed. The object distance storing unit 23 stores information about an object distance output from the distance measuring unit 21 when the main control unit 20 determines that a focusing operation is completed. The allowable difference storing unit 19 stores an allowable difference between a present object distance measured by the distance measuring unit 21 and an object distance in focus stored in the object distance storing unit 23.

The main control unit 20 is operated by partly depressing the release button 27, and in a focusing operation, when it is determined that the focusing lens 15 is focused on the object, the main control unit 20 causes the object distance storing unit 23 to store information about a distance output from the distance measuring unit 21 during the focusing operation. Then the main control unit 20 determines whether or not a difference between the distance stored in the object distance storing unit 23 and the present object distance output from the distance measuring unit 21 is larger than the allowable difference stored in the allowable difference storing unit 19. If the difference is larger than the allowable difference, the main control unit 20 stops the focusing operation to maintain the present focal state, and conversely, if the difference is smaller than the allowable difference, the main control unit 20 continues a usual focusing operation.

The actual usage of this automatic focusing device is described below with reference to FIGS. 8a and 8b.

As shown in the drawings, assume that a photographer selects an airplane flying in the sky as an object to be photographed. In such a case, in which an airplane moving at a high speed is to be photographed as shown in FIG. 8a, the photographer looks in the view finder and points the camera at the airplane 35 to position it in the distance measuring zone 30. In this condition, if the release button 27 is partly depressed, the focusing lens 15 is driven to always be focused on the airplane 35. If the photographer can not follow the airplane 35, and the airplane 35 moves out of the distance measuring zone 30 as shown in FIG. 8b, the focusing lens 15 is kept at the lens position at which the lens 15 was focused on the airplane 35 just before it moved out of the distance measuring zone 30.

Figure 8A:
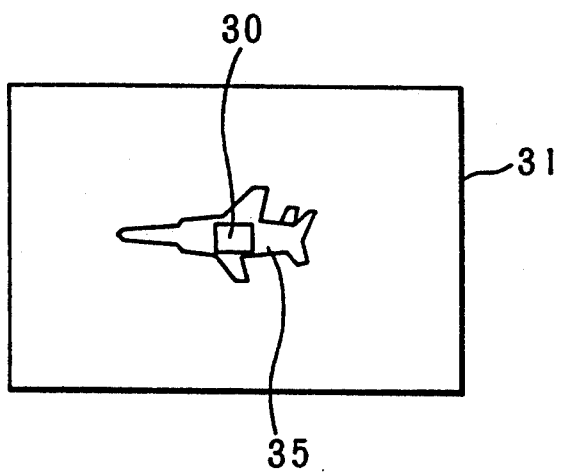
FIG. 8a is a schematic view showing a state in which an object is in a distance measuring zone.

Then, when the photographer moves the camera to place the airplane 35 in the distance measuring zone 30 again as shown in FIG. 8a, as described above, the focusing lens 15 is driven to be always focused on the airplane 35.

Accordingly, even if the photographer allows the object to move out of the distance measuring zone 30, when the object is again placed in the distance measuring zone 30, the focusing lens 15 can be focused on the object in a short time.

Note that the operation described above may be carried out automatically under a camera control, or may be carried out in a mode such that the above operation is carried out only when this mode is selected.

The focusing operation described above is explained below with reference to the flow charts shown in FIGS. 9 through 11. This operation is carried out in accordance with programs stored in a RAM provided in the main control unit 20. Note that, in a usual camera operation, although an AE calculation for obtaining an exposure value such as a shutter speed and an aperture value, an exposure process in which a shutter and an aperture are operated according to the exposure value to expose a film, a film winding process, and other processes are carried out, these processes are not necessary to an understanding the present invention, and therefore, explanations thereof are omitted.

Figure 9:
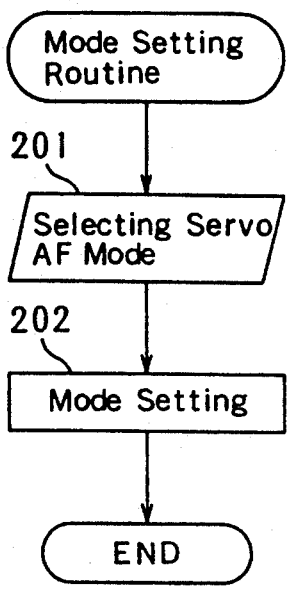
FIG. 9 is a flow chart of a process for setting a mode of an automatic focusing operation.

FIG. 9 is a flow chart of a mode setting routine for carrying out a focusing operation of the embodiment described above. When the mode is set, first a mode switch provided to a camera is operated to select a servo AF mode in STEP 201. If this mode is selected, the camera is set to the servo AF mode in STEP 202. Note that, as described above, this mode may be carried out automatically as a series of controls by the camera.

Figure 10:
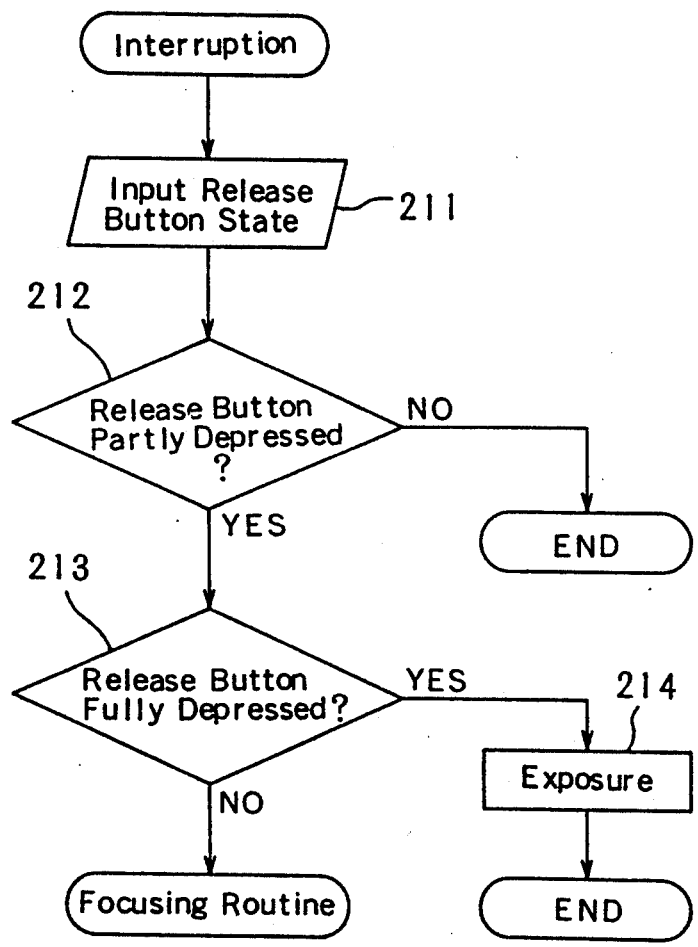
FIG. 10 is a flow chart of a process for checking a state of a release button.

FIG. 10 is a flow chart of a routine for determining a state of the release button 27 when carrying out the focusing operation. This routine is carried out at predetermined intervals by a timer interruption.

When an interrupt signal is output, in STEP 211, an operated state of the release button 27 is input. The operated state means a state in which the release button 27 is not depressed, a state in which the release button 27 is partly depressed, and a state in which the release button 27 is fully depressed.

In STEP 212, if the release button 27 is not depressed, i.e., if the distance measuring switch SWS is not turned ON, the process goes from STEP 212 to an END process, and then this routine waits until a time interruption is carried out. If it is determined in STEP 212 that the release button 27 is partly depressed, i.e., if the distance measuring switch SWS is turned ON, the process goes to STEP 213 in which it is determined whether or not the release button 27 is fully depressed, i.e., whether or not the release switch SWR is turned ON. In STEP 213, if the release button 27 is not fully depressed, it is considered that the release button 27 is partly depressed, and thus the process goes to a focusing routine. Conversely, if the release button 27 is fully depressed, the process goes to STEP 214 to carry out an exposure, and then goes to an END process. Note that, in the exposure process, a light measurement and an AE calculation are carried out before an exposure operation of a film, and after the exposure, the film is wound forward by one frame.

This interruption routine shown in FIG. 10 is provided for periodically determining whether or not the release switch 27 is partly depressed.

The focusing routine is a subroutine for the AF mode set in the mode setting routine shown in FIG. 9. In this embodiment, since the servo AF mode has been selected, the process goes to the servo AF routine.

Figure 11:
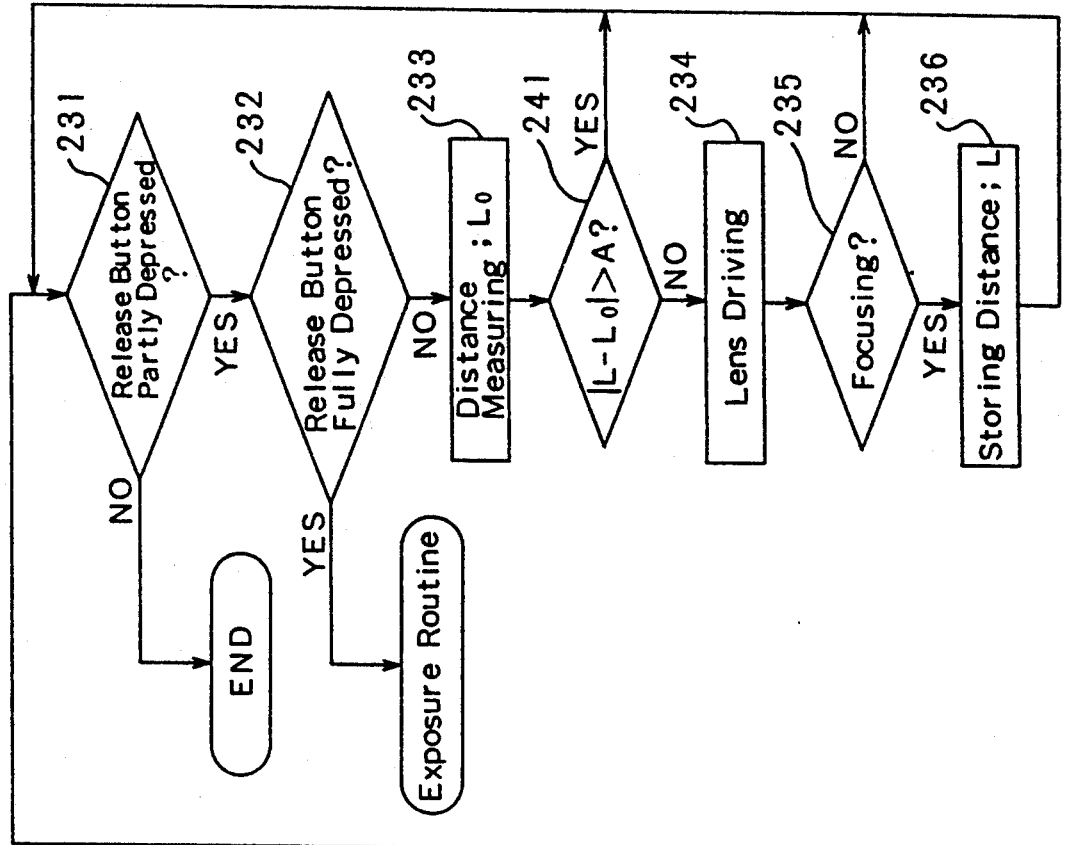
FIG. 11 is a flow chart of a process of an automatic focusing operation.
Figure 11:
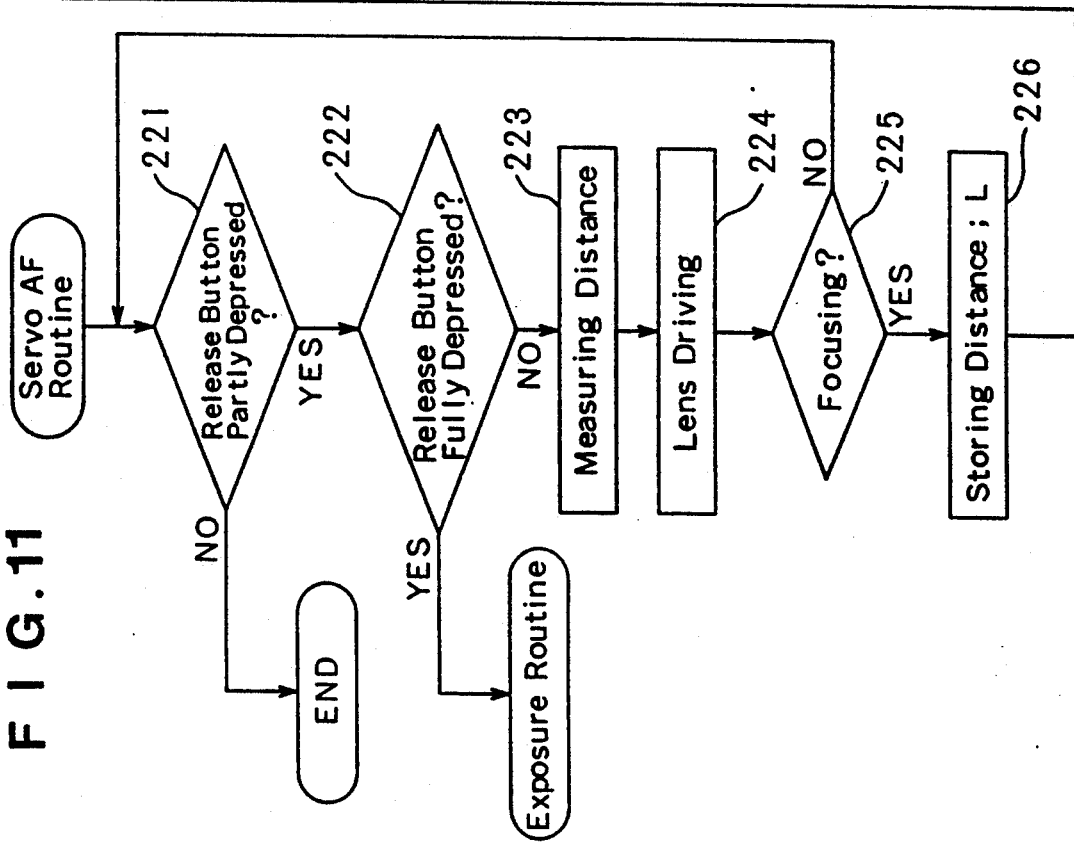

FIG. 11 is a flow chart of a servo AF operation in this embodiment. The process is described below with reference to FIG. 11 together with FIGS. 8a and 8b.

In STEP 221, it is determined whether or not the release button 27 is partly depressed. If the release button 27 is partly depressed, the process goes to STEP 222, and conversely, if the release 27 is not operated, the process goes to an END process. In STEP 222, it is determined whether or not the release button 27 is fully depressed. If the release button 27 is fully depressed, the process goes to an exposure routine to carry out an exposure operation, in which a light measurement and an AE calculation are carried out before an exposure of a film. If the release button 27 is not fully depressed, it is considered that the release button 27 is partly depressed, and thus the process goes to STEP 223 to carry out a focusing operation.

In STEP 223, the distance measuring unit 21 is operated to measure an object distance, and the main control unit 20 carries out a measurement calculation based on a distance signal obtained from the distance measuring unit 21, to obtain a defocus amount and direction (i.e. a revolution number and a revolution direction of an AF motor). Then the process goes to STEP 224, in which the lens driving unit 26 is controlled through the lens driving circuit 24, so that the focusing lens 15 is moved to a focusing position. The process then goes to STEP 225.

In STEP 225, it is determined whether or not the focusing lens 15 is at the focused position, i.e., the focusing operation is completed. If the focusing operation is not completed, the process returns to STEP 221 and the focusing operation is continued. If the focusing operation is completed, the process goes from STEP 225 to STEP 226, in which the distance L of the object when in focus is stored to the object distance storing unit 23. Then the process goes to STEP 231.

In STEPS 231 and 232, as in STEPS 221 and 222, the state of the release button 27 is determined. Note, if the release button 27 is not operated, the process goes to an END process, if the release button 27 is fully depressed, the process goes to the exposure routine to carry out an exposure, and if the release button 27 is partly depressed, the process goes to STEP 233 in which a distance measurement is carried out to obtain an object distance $L_0$ (a measured distance $L_0$). The process then goes to STEP 241.

In STEP 241, it is determined whether or not the absolute value of a difference between the distance L of an object when in focus and the measured distance $L_0$ is larger than an allowable difference A stored in the allowable difference storing unit 19. Namely, it is determined whether or not the object distance has abruptly changed. If the object distance has abruptly changed, a movement of the focusing lens 15 is not carried out and the process returns to STEP 231. Conversely, if the object distance has not abruptly changed, the process goes to STEP 234.

Figure 8B:
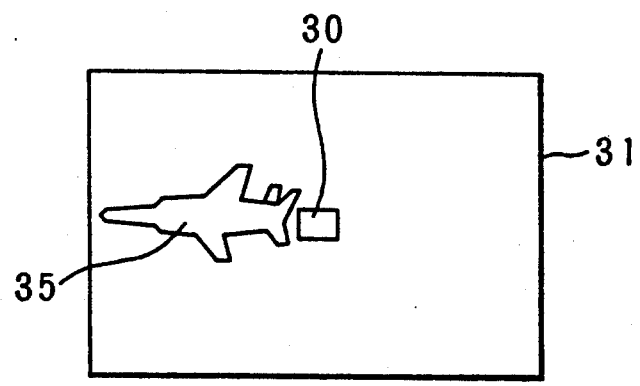
FIG. 8b is a schematic view showing a state in which the object has moved out of the distance measuring zone.

By the process described above, it is determined whether or not the distance from the camera to the object has abruptly changed, i.e., it is determined whether or not the object has moved out of the distance measuring zone 30, as shown in FIG. 8b.

In STEP 234, the focusing lens 15 is driven in accordance with the measured distance $L_0$, and the process than goes to STEP 235, in which it is determined whether or not the focusing operation is completed. If the focusing is not completed, the process returns to STEP 231 to carry out the focusing operation again, and conversely, if the focusing si completed, the process goes to STEP 236. Note that, if the value $|L - L_0|$ obtained by $L_0$ measured in STEP 233 after returning to STEP 231 is larger than the allowable difference A, an operation of the lens driving unit 26 is stopped, or the lens driving unit 26 is operated so that the lens focus is adjusted to the object distance L stored in the object distance storing unit 19.

In STEP 236, the measured distance $L_0$ is stored a distance L of an object when in focus, and then the process returns to STEP 231 to repeat the process described above.

As described above, the automatic focusing device of this embodiment is constructed in such a manner that, once a focusing operation is completed, thereafter, it is determined whether or not the object distance (the measured distance $L_0$) has abruptly changed (STEP 241), e.g., it is determined whether or not the airplane 35 has moved out of the distance measuring zone 30 as shown in FIG. 8b. If the difference is smaller than the allowable difference, the focusing lens 15 is driven to maintain the present focal state, in STEP 234, and whenever a focusing operation is completed, the object distance L is renewed in STEP 236. These processes are repeated in STEPS 231 through 236 for as long as the release button 27 is partly depressed.

On the other hand, if the object moves out of the distance measuring zone 30 while the release button 27 is partly depressed, it is repeatedly determined in STEPS 231 through 241 whether or not a difference between the distance L of the object when in focus and the measured distance $L_0$ is larger than the allowable difference A, and the movement of the focusing lens 15 is stopped until the difference becomes less than the allowable difference A.

Although the distance measuring unit 21 and the lens driving unit 26 repeat the focusing operation after a focusing operation is once completed, if the value $|L - L_0|$ obtained by $L_0$ measured in STEP 233 after returning to STEP 231 becomes larger than the allowable difference A, the lens driving unit 26 is stopped, or is operated in such a manner that the lens focus is adjusted to the distance L of the object when in focus stored in the object distance storing unit 23, or is operated in such a manner that the lens focus is adjusted to a distance measured just before the difference becomes larger than the allowable difference A.

Note that the distance L of the object when in focus stored in the object distance storing unit 23 is initialised when an operation of the release button 27 is discontinued.

As described above, in the automatic focusing device of the present invention, if the object distance is abruptly changed after the focusing operation is completed, since a lens driving operation is not carried out, a time for refocusing is shortened. If the amount of change of the object distance is within the allowable difference A, since the focusing operation is always carried out, a moving object can be easily followed and kept in focus.

Note that, although the difference between the object distances is used as a parameter for determining whether or not the lens driving is to be carried out, in the above embodiment, the different rate of the object distances can be used as this parameter. Although the above embodiment is described such that the distance measuring unit 21 senses an object distance, actually, a defocus amount is obtained by a known method.

Still further, the allowable difference is preferably changed according to a focal length of the lens and an object distance when in focus. For example, the longer the focal length of the lens, the smaller the allowable difference, and the shorter the object distance when in focus, the smaller the allowable difference.

Although the embodiments of the present invention have been described herein with reference to the accompanying drawings, obviously many modifications and changes may be made by those skilled in this art without departing from the scope of the invention.

I claim:

1. An automatic focusing device for a camera, said automatic focusing device comprising:
   means for defining a predetermined range;
   means for measuring an object distance until an object is within said predetermined range;
   means for driving a focusing lens of a photographing lens provided in said camera;
   means for controlling said driving means, based on said object distance measured by said measuring means, so that said focusing lens is driven to be focused on an object; and
   means for determining, in accordance with the object distance measured by said measuring means, whether said object distance is within or outside of said predetermined range;
   said control means comprising means for controlling said lens driving means so that said focusing lens is driven to be focused on said object once said determining means determines that said object distance is within said predetermined range, and restricting operation of said driving means when said determining means determines that said object distance is outside of said predetermined range.

2. An automatic focusing device according to claim 1, wherein said determining means determines whether said object distance is within or outside of said predetermined range, based upon a present object distance measured by said measuring means and a previous object distance when an in-focus condition is obtained by said control means.

3. An automatic focusing device according to claim 2, wherein said determining means determines whether or not a difference between said present object distance and said previous object distance is within said predetermined range.

4. An automatic focusing device according to claim 3, wherein said predetermined range is changed in accordance with a focal length of said photographing lens.

5. An automatic focusing device according to claim 3, wherein said predetermined range is changed in accordance with a object distance when in focus.

6. An automatic focusing device according to claim 4, wherein said predetermined range becomes smaller as said focal length becomes longer.

7. An automatic focusing device according to claim 1, wherein said control means stops an operation of said lens driving means when said determining means determines that said object distance is outside of said predetermined range.

8. An automatic focusing device according to claim 1, wherein said control means operates said lens driving means so that said focusing lens is moved to one of a long limit distance and a short limit distance when said determining means determines that said object distance is outside of said predetermined means.

9. An automatic focusing device according to claim 1, wherein said determined means determines whether said object distance is within or outside said predetermined range in association with a defocus amount.

10. An automatic focusing device for a camera, said automatic focusing device comprising:
    means for measuring an object distance;
    means for driving a focusing lens of a photographing lens provided in said camera;
    means for controlling said driving means, based on said object distance measured by said measuring means, so that said focusing lens is driven to be focused on an object;
    means for storing a long limit distance and a short limit distance defining an object distance range within which said focusing lenses is moved for a focusing operation, said long limit distance and short limit distance being determined in accordance with said object distance measured by said measuring means; and
    means for determining whether or not said object distance measured by said measuring means is within said long limit distance and said short limit distance stored by said limit distance storing means;
    said controlling means controlling said lens driving means so that said focusing lens is driven to be focused on said object when said determining means determines that said object distance measured by said measuring means is within said long limit distance and short limit distance, and restricting operation of said lens driving means when said determining means determines that said object distance is not within said long limit distance and short limit distance;
    said controlling means operates said lens driving means so that said focusing lens is moved to one of said long limit distance and said short limit distance when said determining means determines that said object distance is not within said long limit distance and said short limit distance.

11. An automatic focusing device according to claim 10, wherein said long limit distance and said short limit distance are determined in accordance with a distance signal input from a distance ring provided in said photographing lens.

12. An automatic focusing device according to claim 11, wherein one of said lone limit distance and said short limit distance is set to infinity or a closest photographic range of said camera.

13. An automatic focusing device for a camera, said automatic focusing device comprising:

means for measuring an object distance;

means for driving a focusing lens of a photographing lens provided in said camera;

means for controlling said driving means, based on said object distance measured by said measuring means, so that said focusing lens is driven to be focused on an object;

means for storing a long limit distance and a short limit distance defining an object distance range within which said focusing lenses is moved for a focusing operation, said long limit distance and short limit distance being determined in accordance with said object distance measured by said measuring means; and means for determining whether or not said object distance measured by said measuring means is within said long limit distance and said short limit distance stored by said limit distance storing means;

said controlling means controlling said lens driving means so that said focusing lens is driven to be focused on said object when said determining means determines that said object distance measured by said measuring means is within said long limit distance and short limit distance, and restricting operation of said lens driving means when said determining means determines that said object distance is not within said long limit distance and short limit distance;

said long limit distance and said short limit distance are determined in accordance with a distance signal input from a data back, provided to said camera, by a key operation.

14. An automatic focusing device according to claim 13, wherein said controlling means stops an operation of said lens driving means when said determining means determines that said object distance is not within said long limit distance and said short limit distance.

15. An automatic focusing device according to claim 13, wherein one of said long limit distance and said short limit distance is set to infinity or a closest photographic range of said camera.

16. An automatic focusing device for a camera, said automatic focusing device comprising:

a means for measuring an object distance;

a means for driving a focusing lens of photographing lens provided in said camera to a focusing position;

a means for storing said object distance when in focus;

a means for storing an allowable difference between a present object distance measured by said measuring means and an object distance when in focus stored by said object distance storing means; and a means for controlling a focusing operation based on an object distance measured by said measuring means, to focus on an object, and when said object is in focus, said control means controlling said object distance storing means to store said object distance when in focus, and determining whether or not a difference between a present object distance measured by said measuring means and an object distance stored by said object distance storing means is within said allowable difference stored by said allowable difference storing means, whereby said lens driving means is operated to focus said lens on said object distance measured by said measuring means if said difference is smaller than said allowable difference, and said lens driving means is operated to focus said lens on said object distance stored by said object distance storing means, or is stopped to thereby keep a present focal position, if said difference is larger than said allowable difference.

* * * * *

UNITED STATES PATENT AND TRADEMARK OFFICE
CERTIFICATE OF CORRECTION

PATENT NO.  : 5,227,828
DATED       : July 13, 1993
INVENTOR(S) : T. KIRIGAYA

It is certified that error appears in the above-indentified patent and that said Letters Patent is hereby corrected as shown below:

At column 14, line 13 (claim 5, line 3), change "a" to ----an---.

At column 14, line 27 (claim 8, line 6), change "means" to ---range---.

At column 14, line 43 (claim 10, line 12), change "lenses is" to ---lens is---.

At column 15, line 7 (claim 12, line 2), change "lone" to ---long---.

At column 15, line 8 (claim 12, line 3), change "photographic" to ---photographable---.

At column 15, line 21 (claim 13, line 12), change "lenses is" to ---lens is---.

At column 16, line 10 (claim 15, line 8), change "photographic" to ---photographable---.

Signed and Sealed this

Thirteenth Day of September, 1994

Attest:

BRUCE LEHMAN

Attesting Officer

Commissioner of Patents and Trademarks